UNITED STATES PATENT OFFICE.

GROVE JOHNSON AND PERCY RICHARD HARE, OF BROMLEY, ENGLAND.

FERMENTATION OF LIQUIDS.

No. 839,067.     Specification of Letters Patent.     Patented Dec. 18, 1906.

Original application filed March 10, 1904, Serial No. 197,454. Divided and this application filed September 13, 1904. Serial No. 224,328.

*To all whom it may concern:*

Be it known that we, GROVE JOHNSON and PERCY RICHARD HARE, analytical chemists, subjects of the King of Great Britain, residing at 8 Hawes road, Bromley, in the county of Kent, England, have invented certain new and useful Improvements Relating to the Fermentation of Liquids, of which the following is a specification.

This invention relates to the fermentation of liquids with the aid of a ferment which we have isolated and termed "saccharomyces thermantitonum," (the heat-resister,) whose characteristics are fully set forth in the specification forming part of our application, Serial No. 197,454, dated March 10, 1904, of which the present is a divisional application, the objects being to effect economy in the carrying out of the process of fermentation, to expedite such process, and to improve the condition and keeping qualities of the liquids.

The ferment hereinbefore referred to and which constitutes the essential feature of our application before mentioned was discovered while experimenting with a view to ascertaining the fermenting properties of the eucalyptus leaves, said ferment being obtained by immersing the leaves of the eucalyptus-plant in a saccharine solution. Observations taken while thus under treatment disclosed the fact that fermentation was taking place. Microscopical examination of the mixture and the subjecting the same to various tests and experimental trial resulted in the determining of a hitherto-unrecognized organism eminently adapted to promote alcoholic fermentation.

To obtain the alcoholic ferment saccharomyces thermentitonum direct from the eucalyptus-leaf in quantities for commercial purposes, the following rules should be observed: A laboratory-flask of a capacity of three liters, for example, should be sterilized and filled about half-full of carefully-boiled brewers' wort of any gravity, $-1.050$ answers well. The flask containing the wort should be reboiled on two successive days and while still boiling be stoppered with aseptic cotton-wool. The temperature of the flask should then be reduced to 80° centigrade, (176° Fahrenheit,) and three or four eucalyptus-leaves should then be immediately inserted, the cotton-wool replaced in the neck, and then the whole be allowed to cool to 40° to 43° centigrade, (104° to 109.4° Fahrenheit.) After four or five days bubbles of carbon-dioxid gas, due to fermentation, will be observed in the wort, which, gradually increasing, coincides with the formation of cells of saccharomyces thermantitonum, which settle (more particularly at the close of the fermentation) in a compact mass at the bottom of the flask. For practical purposes this yeast (saccharomyces thermantitonum) should be pure, for the reason that bacteria and wild yeast, at any rate the greater part thereof, will have been destroyed at the time of introducing the leaf into the wort at 180° Fahrenheit; but lest there should be any doubt as to whether the cells be truly saccharomyces thermantitonum, resort must be taken to the ordinary method of the bacteriologist and a nutritive gelatin plate or jelly of agar-agar containing wort must be taken and innoculated with the cells, care being taken that the medium containing the cells to be used for innoculating be sufficiently diluted so that a colony eventually develops on the jelly for further examination from one cell only. Upon the colony being formed a flask of sterile wort should be innoculated from it, sufficient yeast being thus shortly ready for investigation.

Saccharomyces thermantitonum may be recognized chiefly by, first, its unusual clump formation; second, by its high optimum temperature for fermentation—viz., 110° Fahrenheit—and, third, by its resistance to destruction if submitted to a temperature of 180° Fahrenheit for five minutes, no known species having this characteristic. It will of course yield principally ethyl alcohol.

Brewers according to present practice (regulated obviously by the conditions under which alcoholic fermentation by yeast is accomplished) are compelled to use large areas of coolers, refrigerators, or like appliances, entailing cost of water or of pumping, waste of time, labor, and of valuable space, with the contingent risk of putrefaction or adulteration during exposure. These objections are obviated by carefully observing the following rules in connection with the use of the hereinbefore-described ferment: The wort is to be conveyed, without loss of time, from the hop-back, as hot and bright as possible, to the fermenting vessel. Preferably this should be done without the intermediate use of settling-tanks and the like, providing always that the wort runs bright, the great object being to avoid exposure and loss of temperature, thus jeopardizing sterility. The fermentation is conducted in covered vessels preferably constructed of metal provided with manholes, such cocks as may readily suggest themselves, pressure-valves for permitting the escape of excess of carbon dioxid, and attemperators or some suitable construction of "jacket" to control the temperature. The wort should be introduced into the fermenting vessel as hot as possible—say, for example, 180° Fahrenheit. Although we have found the temperature (180° Fahrenheit) here referred to desirable with a view to effecting perfect sterilization, it will probably be unnecessary in practice to collect the wort at such temperature. Having introduced the wort, the manhole should immediately be closed. The temperature should then be allowed to fall, either spontaneously or, if time be an object, with the assistance of the attemperator or jacket, to 120° Fahrenheit, the ferment being then introduced through the manhole and well "roused" in, after which the manhole should be closed. Fermentation will commence immediately and proceed with increased vigor as the temperature falls to 105° Fahrenheit. Should there be a tendency for the temperature to fall below 95° Fahrenheit before fermentation is complete, (although this is unlikely to happen with large volumes of liquid,) hot water or steam should be passed into the jacket or attemperators for the purpose of maintaining the requisite temperature.

The precise quantity of ferment necessary for accomplishing complete fermentation within the time limit regulated by the temperature falling from 120° Fahrenheit to 90° Fahrenheit is ascertainable only by experience. Any excess, by weight, of the ferment as compared with ordinary yeast will not, however, be injurious, as, according to our experience, no flavor resembling "yeast-bite" is imparted under normal conditions. As an example, one kilo of ferment may be added to five hectoliters of wort or mass to be fermented.

If it is desired to obtain perfect fermentation with the improved ferment while avoiding all chances of contamination—in a sterile wort—the wort must be collected in the fermenting vessel at a temperature not less than 175° Fahrenheit, the ferment being immediately inserted and the manhole pertaining to the vessel closed. Care must then be taken to reduce the temperature as rapidly as possible with the means provided to about 105° Fahrenheit, because, as we have already demonstrated, length of time and exposure to high temperatures cause the ferment to become dormant, varying in extent according to the period it is so exposed.

As a result of the employment of the hereinbefore-described ferment the action of yeast-pressing and the employment of the product with its crude taste is rendered unnecessary, the ferment settling spontaneously in a compact mass upon the completion of each fermentation. Yeast-pressing is the process of separating brewers' yeast from the beer mixed with it, the said beer carrying a most objectionable flavor, but being too valuable to be wasted. Moreover, the process of brewing in tropical countries or during periods of high temperature is rendered capable of accomplishment without being subjected to the difficulties and considerable expense incidental to the employment of ice plants rendered necessary by the use of common yeast. It may with appropriateness be remarked that the ferment appears to be the organism provided by nature to overcome all the difficulties due to atmospheric temperatures of 80° Fahrenheit and upward.

What we claim, and desire to secure by Letters Patent of the United States, is—

1. The process of fermenting which consists in cooling the hot wort to not lower than 120° Fahrenheit, introducing thereinto, while at the temperature to which it is cooled, a ferment yielding principally ethyl alcohol and capable of resisting a temperature of 170° Fahrenheit, and conducting the fermentation at a temperature between 95° and 120° Fahrenheit.

2. The process of fermenting liquids which consists in introducing the wort while in a hot and bright state into a fermenting vessel and allowing it to cool to approximately 120° Fahrenheit, introducing a ferment into the wort while at this temperature, and maintaining the temperature of the wort while fermenting at or above 95° Fahrenheit.

3. The process of fermenting liquids which consists in introducing the wort into a closed fermenting vessel while the wort is at or above a temperature producing sterilization, cooling the wort, and introducing into the wort when it is at or above the temperature of 120° Fahrenheit, a ferment capable of fermenting at such a temperature.

4. The process of fermenting liquids which consists in introducing "saccharomyces thermantitonum" into the wort while the wort is in a hot and bright state.

5. The process of fermenting liquids which consists in introducing "saccharomyces thermantitonum" into the wort at a temperature of 120°.

6. The process of fermenting liquids which consists in introducing "saccharomyces thermantitonum" into the wort before it is cooled.

7. Alcoholic fermented liquors containing cells of "saccharomyces thermantitonum."

8. The process of fermenting liquids which consists in introducing the wort into a closed fermenting vessel while the wort is at or above the temperature producing sterilization, cooling the wort to 105° Fahrenheit, and introducing into the wort while it is at a temperature above 105° Fahrenheit, a ferment capable of fermenting at such a temperature.

In testimony whereof we have hereunto set our hands, in presence of two subscribing witnesses, this 26th day of August, 1904.

GROVE JOHNSON.
PERCY RICHARD HARE.

Witnesses:
EDWARD W. JOHNSON,
T. J. OSMAN.